(12) United States Patent
Faxér et al.

(10) Patent No.: US 11,108,527 B2
(45) Date of Patent: Aug. 31, 2021

(54) CQI CODEPOINT REINTERPRETATION

(71) Applicant: TELEFONAKTIEBOLAGET LM ERICSSON (PUBL), Stockholm (SE)

(72) Inventors: Sebastian Faxér, Järfälla (SE); Mattias Andersson, Sundbyberg (SE); Oskar Nordmark, Stockholm (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 16/467,482

(22) PCT Filed: Apr. 19, 2019

(86) PCT No.: PCT/IB2019/053281
§ 371 (c)(1),
(2) Date: Jun. 6, 2019

(87) PCT Pub. No.: WO2019/215526
PCT Pub. Date: Nov. 14, 2019

(65) Prior Publication Data
US 2020/0382261 A1    Dec. 3, 2020

Related U.S. Application Data

(60) Provisional application No. 62/670,474, filed on May 11, 2018.

(51) Int. Cl.
*H04L 5/00* (2006.01)
*H04B 7/06* (2006.01)
*H04L 1/00* (2006.01)

(52) U.S. Cl.
CPC .......... *H04L 5/0057* (2013.01); *H04B 7/0632* (2013.01); *H04L 1/0003* (2013.01); *H04L 1/0026* (2013.01); *H04L 5/0007* (2013.01)

(58) Field of Classification Search
None
See application file for complete search history.

(56) References Cited

U.S. PATENT DOCUMENTS

2012/0314667 A1* 12/2012 Taoka ................... H04L 1/1896
                                                370/329
2014/0301306 A1* 10/2014 Kim ...................... H04L 5/0057
                                                370/329

FOREIGN PATENT DOCUMENTS

EP          2557839 A1      2/2013

* cited by examiner

*Primary Examiner* — Ayanah S George
(74) *Attorney, Agent, or Firm* — Sage Patent Group

(57) ABSTRACT

According to an aspect, a wireless device is configured to report, to a base station, channel quality information (CQI) using a predetermined set of CQI index values, where each CQI index value is interpreted by the wireless device and the base station as corresponding to a combination of modulation and coding rate. The wireless device determines, based on a downlink signal configuration, that a first one of the CQI index values corresponds to no modulation and coding rate that can be used for transmissions to the wireless device from the base station. The wireless device transmits the first CQI index value to the base station to signal information other than a combination of modulation and coding rate. The base station receives the first CQI index value and interprets it to signal information other than a combination of modulating and coding rate.

12 Claims, 17 Drawing Sheets

1300

DETERMINE, BASED ON A DOWNLINK SIGNAL CONFIGURATION, THAT A FIRST ONE OF THE CQI INDEX VALUES CORRESPONDS TO NO MODULATION AND CODING RATE THAT CAN BE USED FOR TRANSMISSIONS TO THE WIRELESS DEVICE FROM THE BASE STATION
1302

↓

TRANSMIT THE FIRST ONE OF THE CQI INDEX VALUES TO THE BASE STATION TO SIGNAL INFORMATION OTHER THAN A COMBINATION OF MODULATION AND CODING RATE
1304

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

*FIG. 3*

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*FIG. 4*

| $N_{oh}^{PRB}$ | 0 | 6 | 12 | 18 |
|---|---|---|---|---|
| DMRS symbols 1 | 1 | 0,954545 | 0,909091 | 0,863636 |
| 2 | 1 | 0,95 | 0,9 | 0,85 |
| 3 | 1 | 0,944444 | 0,888889 | 0,833333 |
| 4 | 1 | 0,9375 | 0,875 | 0,8125 |

*FIG. 8*

| $N_{oh}^{PRB}$ | 0 | 6 | 12 | 18 |
|---|---|---|---|---|
| DMRS symbols 1 | No | No | No | No |
| 2 | No | No | No | No |
| 3 | No | No | No | No |
| 4 | No | No | No | Yes |

*FIG. 9*

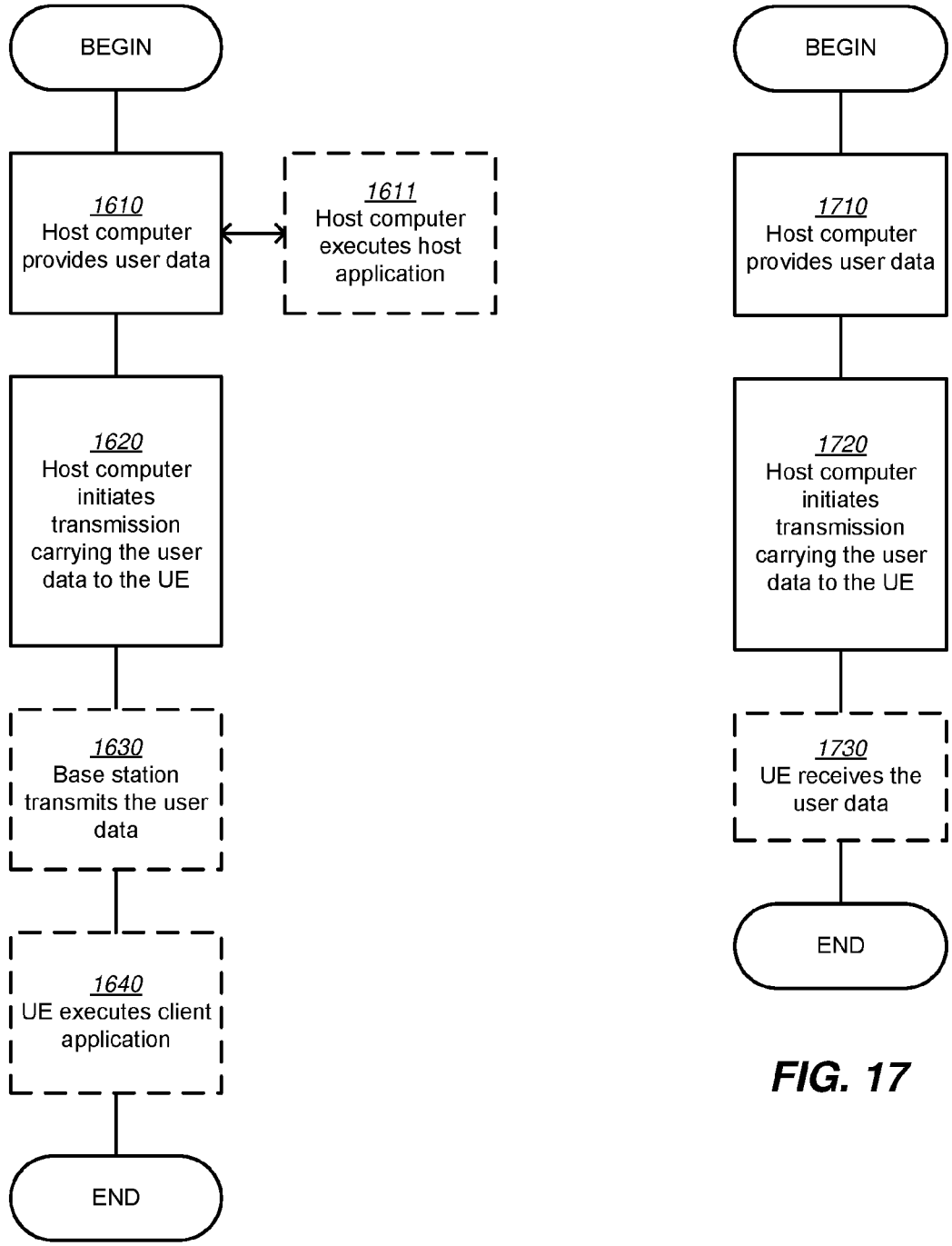

CQI CODEPOINT REINTERPRETATION

RELATED APPLICATIONS

This application is a national stage application of International Patent Application No. PCT/IB2019/053281, filed Apr. 19, 2019, which claims the benefit of U.S. provisional patent application Ser. No. 62/670,474, filed May 11, 2018, the disclosures of which are hereby incorporated herein by reference in their entirety.

TECHNICAL FIELD

The present disclosure generally relates to the field of wireless network communications, and more particularly, to reporting and receiving channel quality information (CQI), using a predetermined set of CQI index values, where each of the CQI index values are interpreted as corresponding to a combination of modulation and coding rate.

BACKGROUND

The next generation mobile wireless communication system (5G) or new radio (NR) will support a diverse set of deployment scenarios. NR includes deployment at both low frequencies (100s of MHz) similar to Long Term Evolution (LTE) and very high frequencies (mm waves in the tens of GHz). Similar to LTE, NR will use orthogonal frequency-division multiplexing (OFDM) in the downlink (i.e., from a network node, gNB, eNB, or base station, to a user equipment or UE). In the uplink (i.e., from UE to gNB), both Discrete Fourier Transform-spread (DFT-spread) Orthogonal Frequency Division Multiplexing (OFDM) and OFDM will be supported.

The basic NR physical resource is as a time-frequency grid as illustrated in FIG. 1, where each resource element (RE) corresponds to one OFDM subcarrier during one OFDM symbol interval. Resource allocation in a slot is described in terms of resource blocks (RBs) in the frequency domain and number of OFDM symbols in the time domain. An RB corresponds to 12 contiguous subcarriers and a slot consists of 14 OFDM symbols.

Different subcarrier spacing values are supported in NR. The supported subcarrier spacing values (also referred to as numerologies) in NR are given by $\Delta f=(15\times 2^\alpha)$ kHz where $\alpha$ is a non-negative integer. In the time domain, downlink and uplink transmissions in NR is organized into equally-sized subframes similar to LTE as shown in FIG. 2. A subframe is further divided into slots and the number of slot per subframe is $2^{(\alpha+1)}$ for a numerology of $(15\times 2^\alpha)$ kHz.

NR supports "slot based" transmission. In each slot, the gNB transmits downlink control information (DCI) about which UE data is to be transmitted to and what resources in the current downlink slot the data is transmitted on. The DCI is carried on the Physical Control Channel (PDCCH) and data is carried on Physical Downlink Shared Channel (PDSCH). This PDCCH is typically transmitted in control resource sets (CORESETs) in the first few OFDM symbols in each slot. A UE first decodes PDCCH and if a PDCCH is decoded successfully, it then decodes the corresponding PDSCH based on the decoded DCI in the PDCCH.

Uplink data transmissions are also dynamically scheduled using PDCCH Similar to downlink, a UE first decodes a uplink grant in a DCI carried by PDCCH and then transmits data over the Physical Uplink Shared Channel (PUSCH) based the decoded control information in the uplink grant such as modulation order, coding rate, uplink resource allocation, etc.

Each UE is assigned with a unique C-RNTI (Cell Radio Network Temporary Identifier) during network connection. The CRC (cyclic redundancy check) bits attached to a DCI for a UE are scrambled by the UE's C-RNTI, so a UE recognizes its own DCI by checking the CRC bits of the DCI against the assigned C-RNTI.

For downlink scheduling of PDSCH, at least the following bit fields are included in a downlink DCI: frequency domain resource assignment; time domain resource assignment; modulation and coding scheme (MCS)—5 bits; new data indicator—1 bit; redundancy version—2 bits; hybrid automatic repeat request (HARQ) process number—4 bits; and zero power (ZP) channel state information reference signal (CSI-RS) trigger—X bits. The MCS field indicates the modulation order and target code rate according to the table in FIG. 3, for a UE configured with a maximum of 64 quadrature amplitude modulation (QAM).

CSI feedback is used by a gNB to obtain downlink CSI from a UE in order to determine how to transmit downlink data to a UE over a plurality of antenna ports. CSI typically includes a channel rank indicator (RI), a precoding matrix indicator (PMI) and a channel quality indicator (CQI). RI is used to indicate the number of data layers that can be transmitted simultaneously to a UE, PMI is used to indicate the precoding matrix over the indicated data layers, and CQI is used to indicate the modulation and coding rate can be achieved by with the indicated rank and the precoding matrix.

The CQI is calculated according to the following procedure. A combination of modulation scheme and transport block (TB) size corresponds to a CQI index if: the combination could be signaled for transmission on the PDSCH in the CSI reference resource according to a TB size determination; the modulation scheme is indicated by the CQI index; and the combination of TB size and modulation scheme when applied to the reference resource results in the effective channel code rate which is the closest possible to the code rate indicated by the CQI index. If more than one combination of TB size and modulation scheme results in an effective channel code rate equally close to the code rate indicated by the CQI index, only the combination with the smallest of such TB sizes is relevant. FIG. 4 illustrates a 4-bit CQI table.

The channel coding scheme for PDSCH in NR is based on low-density parity-check (LDPC) codes. A TB, containing information bits to be transmitted, undergoes the following encoding scheme. First, a CRC is attached to the TB for error detection purpose. If the TB size is larger than a threshold, it is segmented into multiple code blocks (CBs), otherwise the TB is mapped to a single CB. If segmented into multiple CBs, a CRC is attached to each CB to enable error detection on a per-CB level. Multiple CBs can be grouped together to form a Code Block Group (CBG), and if CBG-based retransmission is configured, the UE may transmit ACK/NACK separately for each CBG, such that only incorrectly decoded CBGs needs to be retransmitted instead of the entire TB. Each CB undergoes a separate LDPC encoding procedure, mapping the information bits in the CB to coded output bits.

The coded output bits per CB are then placed in a circular buffer, where a bit level interleaver is also applied. In the next step of the procedure, rate matching is applied to read out the desired number of coded bits from the circular buffer per CB, so as to fit the resource allocation of the PDSCH. Bits are read out of the buffer starting at a certain starting point, indicated by the redundancy version (RV). Four different RVs (0, 1, 2, 3) are defined, corresponding to different starting positions in the circular buffer. The intention is that different RVs can be transmitted in initial transmissions and retransmissions, realizing the incremental redundancy (IR) HARQ scheme. After rate matching per CB, the rate matched output bits from the CBs are concatenated and finally mapped to REs allocated for the PDSCH. FIGS. 5 and 6 illustrate this procedure involving LDPC encoding of TBs.

When the UE received a DCI scheduling PDSCH transmission, it is indicated with the PDSCH resource allocation, an MCS, a new data indicator (NDI) and an RV for each codeword (CW). Up to two CWs may be transmitted in a PDSCH in NR. As two CWs are only used for rank 5 transmission and higher, typically only one CW is used. Each CW is mapped to a TB. The MCS indicates the modulation scheme and target code rate for the TB. Based on the target code rate and the PDSCH allocation, the UE derives the TB size based on a formula by calculating the number of available REs for PDSCH assuming a fixed default overhead (thus the TB size determination does not depend on the actual RE overhead in the scheduled slot). The UE maps the received modulation symbols to soft estimates of the coded bits, and stores it in a soft buffer. It then feeds the soft estimates of the coded bits to the low density parity check code (LDPC) decoder and tries to decode the CB. If all CBs are correctly decoded (or all CBs within the CBG if CBG-based retransmission is used), the TB (or CBG) is correctly decoded and the UE transmits a HARQ-ACK on PUCCH. Otherwise, the UE feeds back a HARQ-NACK and the gNB initiates a retransmission of the CB. The UE will maintain its soft buffer until the gNB schedules a new TB, which is indicated by toggling of the NDI bit in the DCI, whereupon the UE flushes its soft buffer and instead stores the soft channel bits corresponding to the new TB. However, in the case of retransmission (NDI not toggled), the UE maintains its soft buffer so that it may combine its previously received transmission with the retransmission for increased decoding success probability.

Typically, in a retransmission, the gNB will transmit another RV. For example, RV0 is transmitted in the initial transmission while RV2 is transmitted in the first retransmission. The UE's soft buffer typically contains room for the entire cyclic buffer. However, in the case where the UE supports multiple component carriers (CCs), the soft buffer size may be constrained so that in some cases it is smaller than the circular buffer size, whereby Chase combining may have to be used instead of IR. The UE will add the estimated soft channel bits corresponding to the retransmission in the correct place in the soft buffer (i.e., starting at the RV position). In the case where an estimate of some bits is already available from a previous transmission, the soft estimates of the bits are combined. FIG. 7 illustrates a circular buffer with different RV starting points.

SUMMARY

The lowest code rate possible that can be indicated with a CQI report is 78/1024, while the lowest code rate possible that can be indicated with the MCS field is 120/1024. Therefore, it is likely that the lowest CQI rate will not be frequently selected, which wastes feedback overhead.

In more detail, a critical flaw in the CQI determination procedure in 3GPP TS 38.214 makes one CQI index (CQI1) not possible for the UE to select due to how the CQI is defined, for almost all configurations. The issue arises due to the fact that the lowest CQI code rate for quadrature phase key shifting (QPSK) is 78/1024 (for CQI1), while the lowest possible MCS (MCS0) corresponds to a code rate of 120/1024. Due to the requirement that a selected CQI index must correspond to a combination of modulation scheme and TB size that could be signaled for transmission on the PDSCH in the CSI reference resource, a signaled MCS code rate of 120/1024 would never correspond to an effective code rate closer to 78/1024 (CQI1) than 120/1024 (CQI2) unless there is a large discrepancy in the PDSCH overhead assumed in TB size determination procedure, compared to the PDSCH overhead assumption in the CSI reference resource.

To mitigate this inefficiency, embodiments of the present invention utilize the un-used CQI codepoint to convey some useful information. Using an un-utilized codepoint to provide the gNB with additional information enables the gNB to perform better scheduling decisions and/or provide reconfiguration of demodulation reference signal (DMRS) densities.

According to some embodiments, a method is performed in a wireless device that is configured to report, to a base station, CQI using a predetermined set of CQI index values, where a CQI index value is interpreted by the wireless device and the base station as corresponding to a combination of modulation and coding rate. The method includes determining, based on a downlink signal configuration, that a first one of the CQI index values corresponds to no modulation and coding rate that can be used for transmissions to the wireless device from the base station. The method also includes transmitting the first one of the CQI index values to the base station to signal information other than a combination of modulation and coding rate.

A wireless device may determine that a CQI index value cannot be used based on information obtained with respect to a reference resource, such as a set of assumptions on the presence of downlink reference signals in the reference resource and/or assumptions on generic reference signal overhead in the reference resource. This information may be compared to a default configuration (downlink assignment). A downlink signal configuration may dictate use of a CQI index value that indicates the modulation and coding rate that can be achieved with a particular RI and PMI. The downlink signal configuration may be used to dictate an effective code rate and/or CQI index value that corresponds to a combination of modulation scheme and TB size. The downlink signal configuration may involve the number of OFDM symbols per subframe occupied by DMRS symbols and the configured number of overhead REs per RB.

According to some embodiments, a method in a base station configured to receive, from a wireless device, CQI that uses a predetermined set of CQI index values, where a CQI index value is interpreted by the wireless device and the base station as corresponding to a combination of modulation and coding rate. The method includes receiving a first one of the CQI index values and determining, based on a downlink signal configuration, that the first one of the CQI index values corresponds to no modulation and coding rate that can be used for transmissions to the wireless device from the base station. The method also includes, responsive to the determining, interpreting the received first one of the CQI index values to signal information other than a combination of modulating and coding rate.

According to some embodiments, a wireless device is configured to report, to a base station, CQI using a predetermined set of CQI index values, where each CQI index value is interpreted by the wireless device and the base station as corresponding to a combination of modulation and coding rate. The wireless device includes transceiver circuitry and processing circuitry operatively associated with the transceiver circuitry. The processing circuitry is configured to determine, based on a downlink signal configuration, that a first one of the CQI index values corresponds to no modulation and coding rate that can be used for transmissions to the wireless device from the base station. The processing circuitry is also configured to transmit the first one of the CQI index values to the base station to signal information other than a combination of modulation and coding rate.

According to some embodiments, a base station is configured to receive, from a wireless device, CQI that uses a predetermined set of CQI index values, where a CQI index value is interpreted by the wireless device and the base station as corresponding to a combination of modulation and coding rate. The base station includes transceiver circuitry and processing circuitry operatively associated with the transceiver circuitry. The processing circuitry is configured to receive a first one of the CQI index values and determine, based on a downlink signal configuration, that the first one of the CQI index values corresponds to no modulation and coding rate that can be used for transmissions to the wireless device from the base station. Responsive to the determining, the base station interprets the received first one of the CQI index values to signal information other than a combination of modulating and coding rate.

Further aspects of the present invention are directed to an apparatus, network node, base station, wireless device, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 3 illustrates a table of modulation order and target code rates.

FIG. 4 illustrates a 4-bit CQI table.

FIG. 8 illustrates a table showing the ratio of number of REs assumed for TBS calculation to the number of REs assumed for CSI reference resource.

FIG. 9 illustrates a table that shows the possibility of selecting CQI=1 according to the current CQI determination procedure.

FIGS. 16 to 19 are flowcharts illustrating example methods implemented in a communication system including a host computer, a base station and a user equipment.

DETAILED DESCRIPTION

Figure 1:
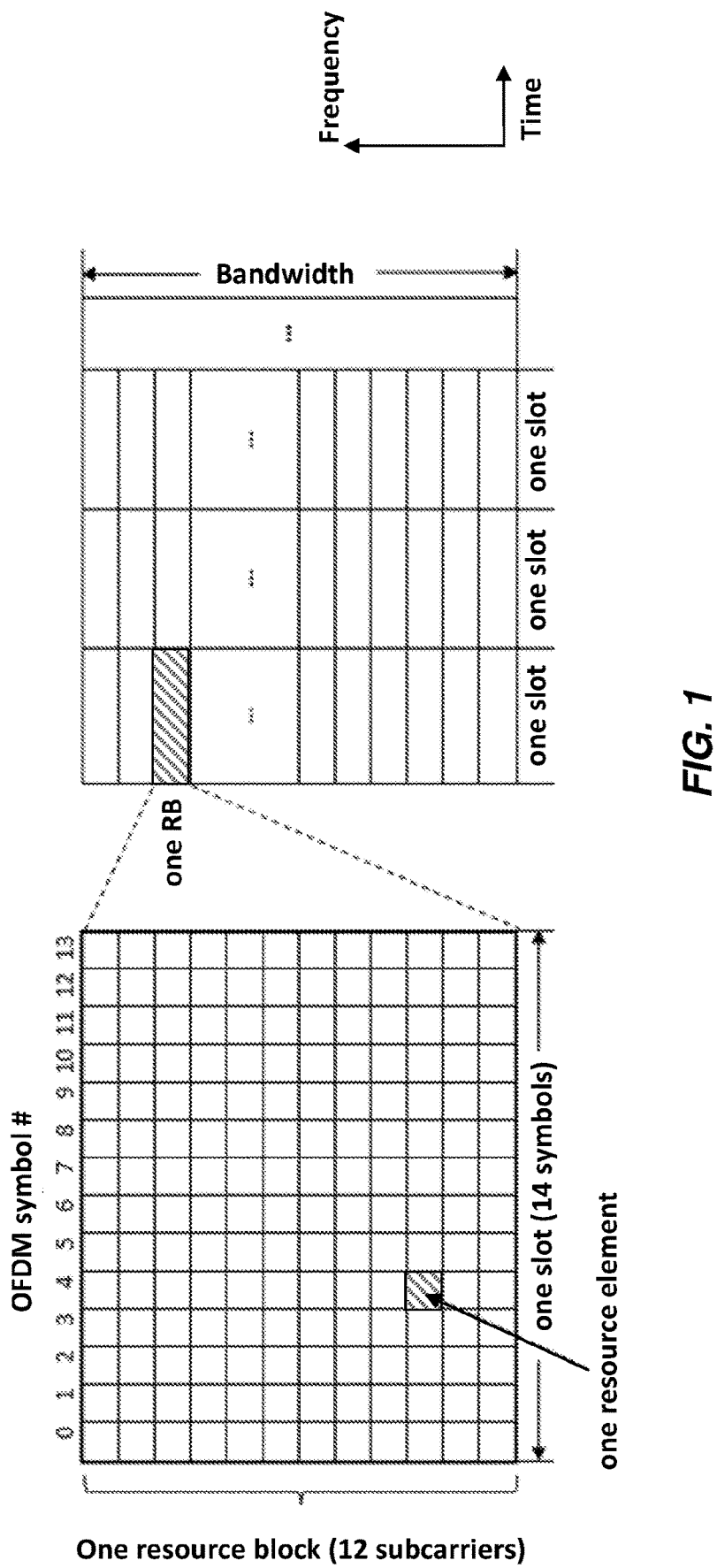
FIG. 1 illustrates a time-frequency grid.
Figure 2:
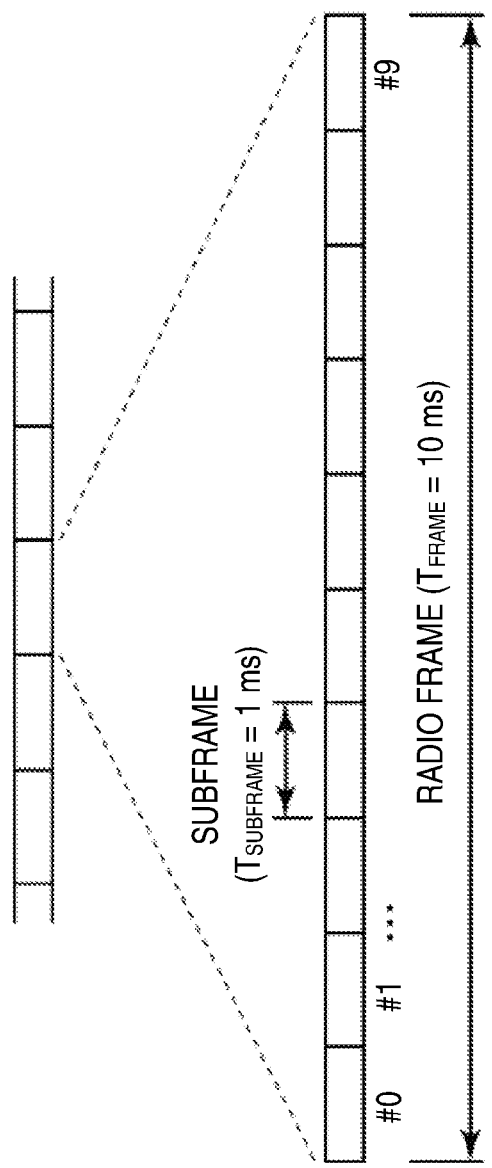
FIG. 2 illustrates NR time-domain structure with 15 kHz subcarrier spacing.
Figure 5:
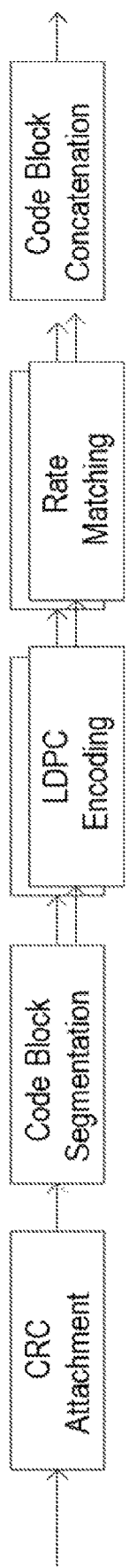
FIGS. 5-6 illustrate this procedure involving LDPC encoding of TBs.
Figure 6:
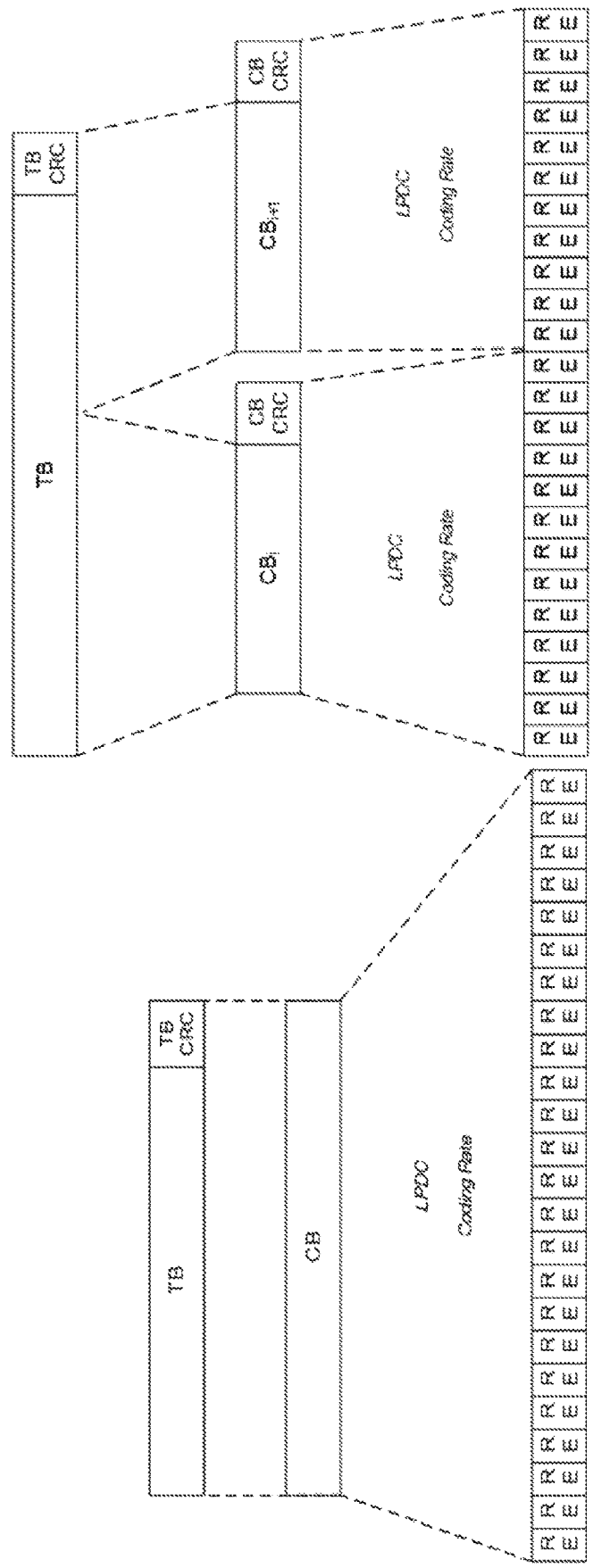
Figure 7:
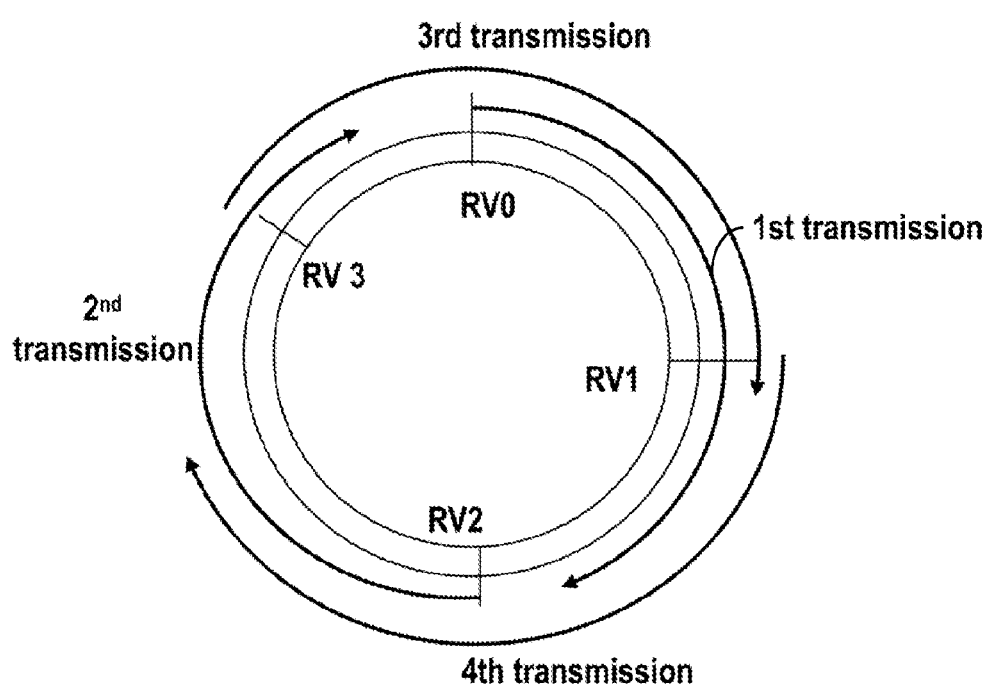
FIG. 7 illustrates a circular buffer with different RV starting points.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

The definition of the CQI in section 5.2.2.1 of 3GPP TS 38.214 is copied below, with the relevant parts to the problem highlighted in bold:

the UE shall derive for each CQI value reported in uplink slot n the highest CQI index which satisfies the following condition:

A single PDSCH transport block with a combination of modulation scheme, target code rate and transport block size corresponding to the CQI index, and occupying a group of downlink physical resource blocks termed the CSI reference resource, could be received with a transport block error probability not exceeding:

0.1, if the higher layer parameter cqi-Table in CSI-ReportConfig configures Table 5.2.2.1-2, or Table 5.2.2.1-3, . . .

A combination of modulation scheme and transport block size corresponds to a CQI index if:

the combination could be signaled for transmission on the PDSCH in the CSI reference resource according to the Transport Block Size determination described in Subclause 5.1.3.2, and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

FIG. 3 illustrates an MCS index table 1 for PDSCH. TS 38.214 continues:

In the CSI reference resource, the UE shall assume the following for the purpose of deriving the CQI index, and if also configured, for deriving PMI and RI:

The first 2 OFDM symbols are occupied by control signaling.

The number of PDSCH and DM-RS symbols is equal to 12.

The same bandwidth part subcarrier spacing configured as for the PDSCH reception.

The bandwidth as configured for the corresponding CQI report.

The reference resource uses the CP length and subcarrier spacing configured for PDSCH reception.

No resource elements used by primary or secondary synchronization signals or PBCH.

Redundancy Version 0.

The ratio of PDSCH EPRE to CSI-RS EPRE is as given in Subclause 4.1.

Assume no REs allocated for NZP CSI-RS and ZP CSI-RS.

Assume the same number of front loaded DM-RS symbols as the maximum front-loaded symbols configured by the higher layer parameter maxLength in DMRS-DownlinkConfig.

Assume the same number of additional DM-RS symbols as the additional symbols configured by the higher layer parameter dmrs-AdditionalPosition.

Assume the PDSCH symbols are not containing DM-RS.

Assume PRB bundling size of 2 PRBs.

To summarize the above procedure, a reported CQI index must correspond to a combination of modulation scheme and TB size such that it could be indicated for PDSCH transmission on the CSI reference resource. The indication of modulation scheme and TB size for PDSCH is done using the MCS table, which indicates the modulation order $Q_m$ and the target code rate R. Based on this input, the TB size for PDSCH is calculated using a procedure that depends on first calculating a "dummy" number of REs within the slot $N'_{RE} = N_{sc}^{RB} \cdot N_{symb}^{sh} - N_{DMRS}^{PRB} - N_{oh}^{PRB}$, where $N_{oh}^{PRB} \in \{0, 6, 12, 18\}$ is a Radio Resource Control (RRC) configured parameter that is intended to take into account an average number of REs, for instance, occupied by CSI-RS and thus not available for PDSCH. For a UE to calculate a CQI according to the specified procedure, it must evaluate which TB size each MCS index would correspond to when applied to the CSI reference resource. For each MCS index, the effective code rate is calculated according to a hypothetical PDSCH scheduled with the corresponding TB size and modulation order on the CSI reference resource. The MCS index is mapped to a CQI index (with the same modulation $Q_m$) such that it minimizes the difference between the calculated effective code rate of the MCS index and the code rate of the CQI index. The highest CQI index that meets the BLER target is selected.

The CSI reference resource assumes 12 OFDM symbols for PDSCH whereof 1-4 OFDM symbols are occupied by DMRS, according to the configured number of DMRS symbols for PDSCH. No other RE signal overhead is assumed. That is, the number of REs per PRB in the CSI reference resource to be used in the assumption for the effective code rate calculation is $N_{RE}^{CSI-ref} = N_{sc}^{RB} \cdot (12 - N_{DMRS}^{sym}) = N_{sc}^{RB} \cdot 12 - N_{DMRS}^{PRB}$, where $N_{DMRS}^{sym}$ is the number of DMRS symbols and $N_{DMRS}^{PRB} = N_{sc}^{RN} N_{DMRS}^{sym}$ is the number of DMRS REs per PRB.

As mentioned in the background, it is almost impossible for the UE to be allowed to select CQI1 (with a code rate of 78/1024) as this must correspond to an effective code rate of hypothetical PDSCH scheduled with MCS0 (i.e., code rate 120/1024) that is closer to 78/1024 than 120/1024 (corresponding to CQI2). This would only occur if the ratio of the number of REs assumed in the TB size determination ($N_{RE}^{TBS} = N_{sc}^{RB} \cdot 12 - N_{DMRS}^{PRB} - N_{oh}^{PRB}$) and the number of REs assumed in the CSI reference resource is low:

$$\text{Ratio} = \frac{N_{sc}^{RB} \cdot 12 - N_{DMRS}^{PRB} - N_{oh}^{PRB}}{N_{sc}^{RB} \cdot 12 - N_{DMRS}^{PRB}}$$

FIG. 8 illustrates a table showing the ratio of number of REs assumed for TB size calculation to the number of REs assumed for CSI reference resource. As seen in the table, this ratio is small when both the number of DMRS symbols and $N_{oh}^{PRB}$ is large.

To quantify if it is actually possible for the UE to select CQI1 according to the CQI determination procedure, all possible combinations of scheduling bandwidth, number of layers, etc. were numerically evaluated to see if the ratio presented in the table of FIG. 8 could be so low so that the effective code rate is closer to 78/1024 than 120/1024. The results are presented in the table in FIG. 9, which shows the possibility of selecting CQI=1 according to the current CQI determination procedure. As seen in this table, it is only possible for the UE to select CQI1 when configured with 4 DMRS symbols and $N_{oh}^{PRB} = 18$, in all other cases it is not possible.

Clearly, the current CQI determination procedure is suboptimal as a CQI codepoint is wasted in most configuration cases. One option could be to revise the CQI determination procedure so that a CQI index need not correspond to a possible TB size in a hypothetical PDSCH scheduling so that, for instance, the UE could assume that the target code rate indicated in the CQI table could be used directly in the TB size determination for the hypothetical PDSCH transmission. Even though a PDSCH transmission with such a low code rate is not possible to schedule the CQI feedback, it could still be useful for the gNB to allow it to schedule PDSCH using slot aggregation, achieving a lower code rate than can normally be achieved with the usual MCS table. However, this could be problematic for RAN4 testability as the block error rate (BLER) for the CQI suggestion would not match the PDSCH scheduling and may not be desired.

In embodiments of the present invention, the CQI codepoint is instead used to convey some useful information to the gNB that can be used for scheduling and/or re-configuration. For instance, when a UE reports CQI0 or out of range, the gNB does not know if this is due to whether the signal-to-interference-plus-noise-ratio (SINR) is too low or whether the DMRS density does not provide sufficient channel estimation accuracy for the UE to correctly demodulate the PDSCH, for instance due to high Doppler. The latter could be amended by the gNB reconfiguring the maximum number of additional and/or frontloaded DMRS symbols. Note that the UE may take the DMRS channel estimation quality into account when determining the CQI, as both the physical resource block (PRB) bundling assumption, as well as the number of frontloaded and additional DMRS symbols assumption, is captured in the CSI reference resource.

Thus, in one such embodiment, when a UE is not configured with a maximum of 4 DMRS symbols (which happens when either maxLength=2 and dmrs-AdditionalPosition=1-3 or when maxLength=1 and dmrs-AdditionalPosition=4 in DMRS-DownlinkConfig) and $X_{oh}$=18, CQI1 could be used to indicate "CQI out of range due to poor DMRS channel estimation quality." That is, it has been observed that it is only possible for the UE to select CQI1 if configured with 4 DMRS symbols and $N_{oh}^{PRB}$=18. In all other cases, it is not possible and the CQI codepoint is wasted. In these cases, when the UE is not configured with a maximum of 4 DMRS symbols and xOverhead=18, CQI=1 is reinterpreted to mean "CQI out of range due to poor DMRS channel estimation quality," according to some embodiments. In other words, it is determined that, based on the downlink signal configuration, that a CQI codepoint, or CQI index value, corresponds to no modulation and coding rate that can be used for transmission to the UE. The CQI index value will be used to transmit signal information other than an MCS (e.g., an out of range indication or that the DMRS density does not provide sufficient channel estimation accuracy).

Figure 10:
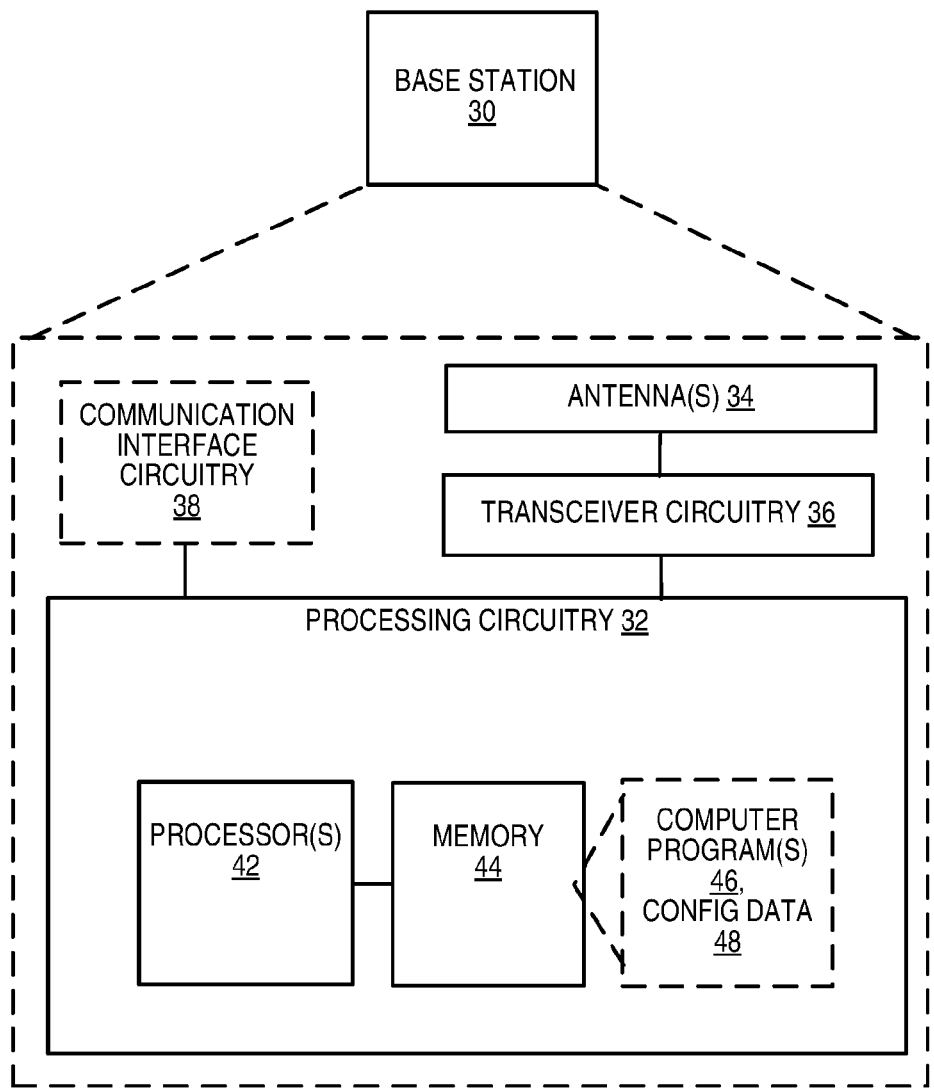
FIG. 10 illustrates is a block diagram of a base station, according to some embodiments.

Accordingly, FIG. 10 shows a base station 30, which may be configured to carry out one or more of these disclosed techniques. Base station 30 may be an evolved Node B (eNodeB), Node B or gNB. While base station 30 is shown in FIG. 10, the base station operations can be performed by other kinds of network access nodes or relay nodes. In the non-limiting embodiments described below, base station 30 will be described as being configured to operate as a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuits 32.

Base station 30 facilitates communication between wireless terminals, other network access nodes and/or the core network. Base station 30 may include communication interface circuitry 38 that includes circuitry for communicating with other nodes in the core network, radio nodes, and/or other types of nodes in the network for the purposes of providing data and/or cellular communication services. Base station 30 communicates with wireless devices using antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

Base station 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or may comprise some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by base station 30. Processing circuitry 32 may be configured, e.g., through the use of appropriate program code stored in memory 44, to carry out one or more of the methods and/or signaling processes detailed hereinafter.

Processing circuitry 32 of base station 30 is configured, according to some embodiments, to receive, from a wireless device, CQI that uses a predetermined set of CQI index values, where each of the CQI index values is normally interpreted by the wireless device and the base station as corresponding to a combination of modulation and coding rate, based on the predetermined set of CQI index values. More specifically, processing circuitry 32 is configured to receive a first one of the CQI index values and determine, based on a downlink signal configuration, that the first one of the CQI index values corresponds to no modulation and coding rate that can be used for transmissions to the wireless device from the base station (the modulation and coding rate normally represented by the CQI index value cannot be used). Processing circuitry 32 is also configured to, responsive to the determination, interpret the received first one of the CQI index values to signal information other than a combination of modulating and coding rate.

Figure 11:
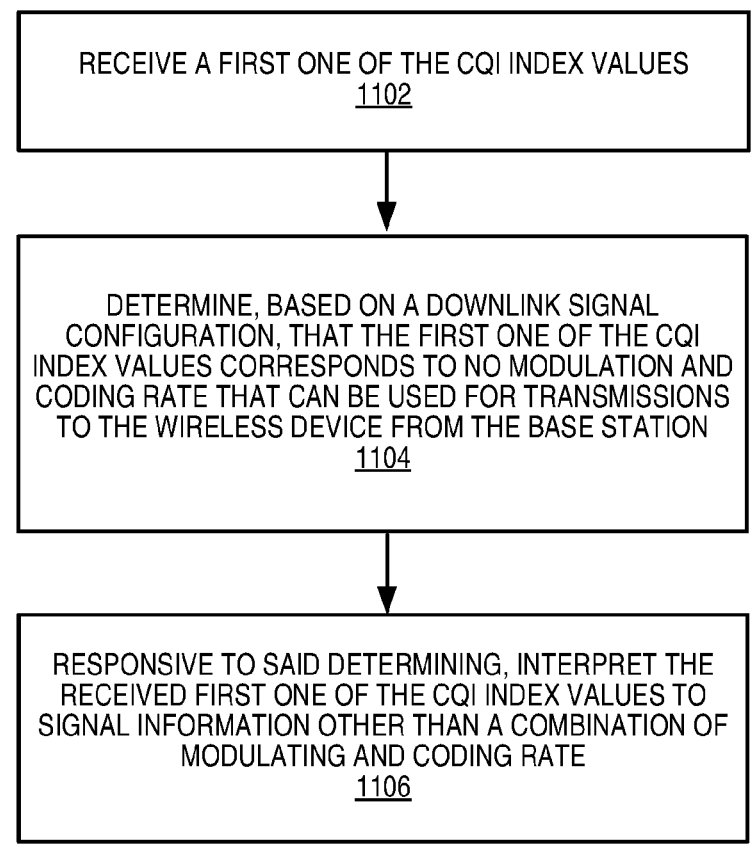
FIG. 11 illustrates a flow diagram of a method at the base station, according to some embodiments.

Processing circuitry 32 is also configured to perform a method 1100, shown in FIG. 11. Method 1100 includes receiving a first one of the CQI index values (block 1102) and determining, based on a downlink signal configuration, that the first one of the CQI index values corresponds to no modulation and coding rate that can be used for transmissions to the wireless device from the base station (block 1104). Method 1100 also includes, responsive to the determining, interpreting the received first one of the CQI index values to signal information other than a combination of modulating and coding rate (block 1104).

In some embodiments, an additional CQI index value is interpreted by the base station as an out of range indication, and the information signaled with the first one of the CQI index values is an alternative out of range indication. The information may indicate that a DMRS density does not provide sufficient channel estimation accuracy for the wireless device to correctly demodulate symbols on a PDSCH.

In some embodiments, determining that the first one of the CQI index values corresponds to no modulation and coding rate that can be used includes determining that the number of OFDM symbols per subframe occupied by DMRS symbols is not 4 and that the configured number of overhead resource elements per resource block is not 18.

Figure 12:
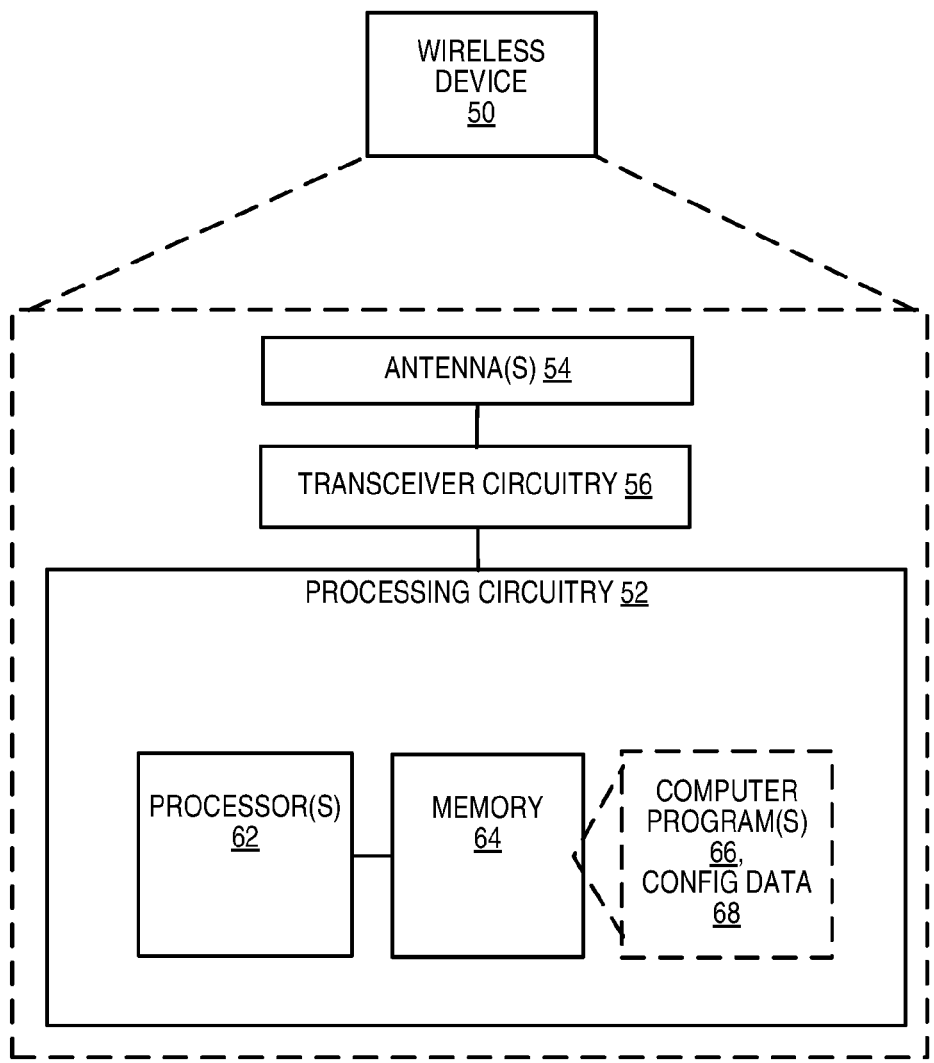
FIG. 12 is a block diagram of a wireless device, according to some embodiments.

FIG. 12 illustrates a diagram of a wireless device 50 configured to carry out one or more of the disclosed techniques, according to some embodiments. Wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies can be NR and LTE for the purposes of this discussion.

Wireless device 50 also includes one or more processing circuits 52 that are operatively associated with radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to report, to a base station, CQI using a predetermined set of CQI index values, where each of the CQI index values is normally interpreted by wireless device 50 and the base station as corresponding to a combination of modulation and coding rate. Processing circuitry 52 is configured to determine, based on a downlink signal configuration, that a first one of the CQI index values corresponds to no modulation and coding rate that can be used for transmissions to the wireless device from the base station (or corresponds to a modulation and coding rate cannot be used for transmission). Processing circuitry 52 is also configured to transmit the first one of the CQI index values to the base station to signal information other than a combination of modulation and coding rate.

Figure 13:
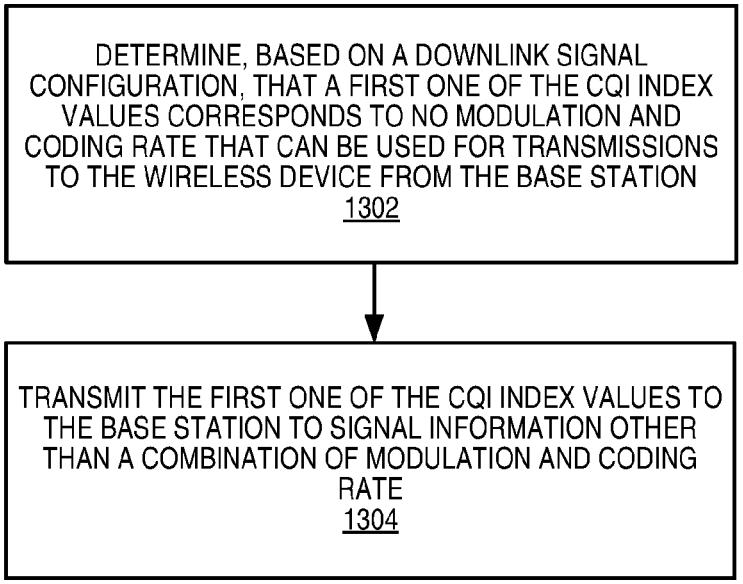
FIG. 13 illustrates a flow diagram of a method at the wireless device, according to some embodiments.

Processing circuitry 52 may be configured to perform a corresponding method 1300, shown in FIG. 13. Method 1300 includes determining, based on a downlink signal configuration, that a first one of the CQI index values corresponds to no modulation and coding rate that can be used for transmissions to the wireless device from the base station (block 1302). Method 1300 also includes transmitting the first one of the CQI index values to the base station to signal information other than a combination of modulation and coding rate (block 1304).

In some embodiments, an additional CQI index value is interpreted by the base station as an out of range indication, and wherein the information signaled with the first one of the CQI index values is an alternative out of range indication.

The information may indicate that a DMRS density does not provide sufficient channel estimation accuracy for the wireless device to correctly demodulate symbols on a PDSCH.

In some embodiments, determining that the first one of the CQI index values corresponds to no modulation and coding rate that can be used includes determining that the number of OFDM symbols per subframe occupied by DMRS symbols is not 4 and that the configured number of overhead resource elements per resource block is not 18.

Figure 14:
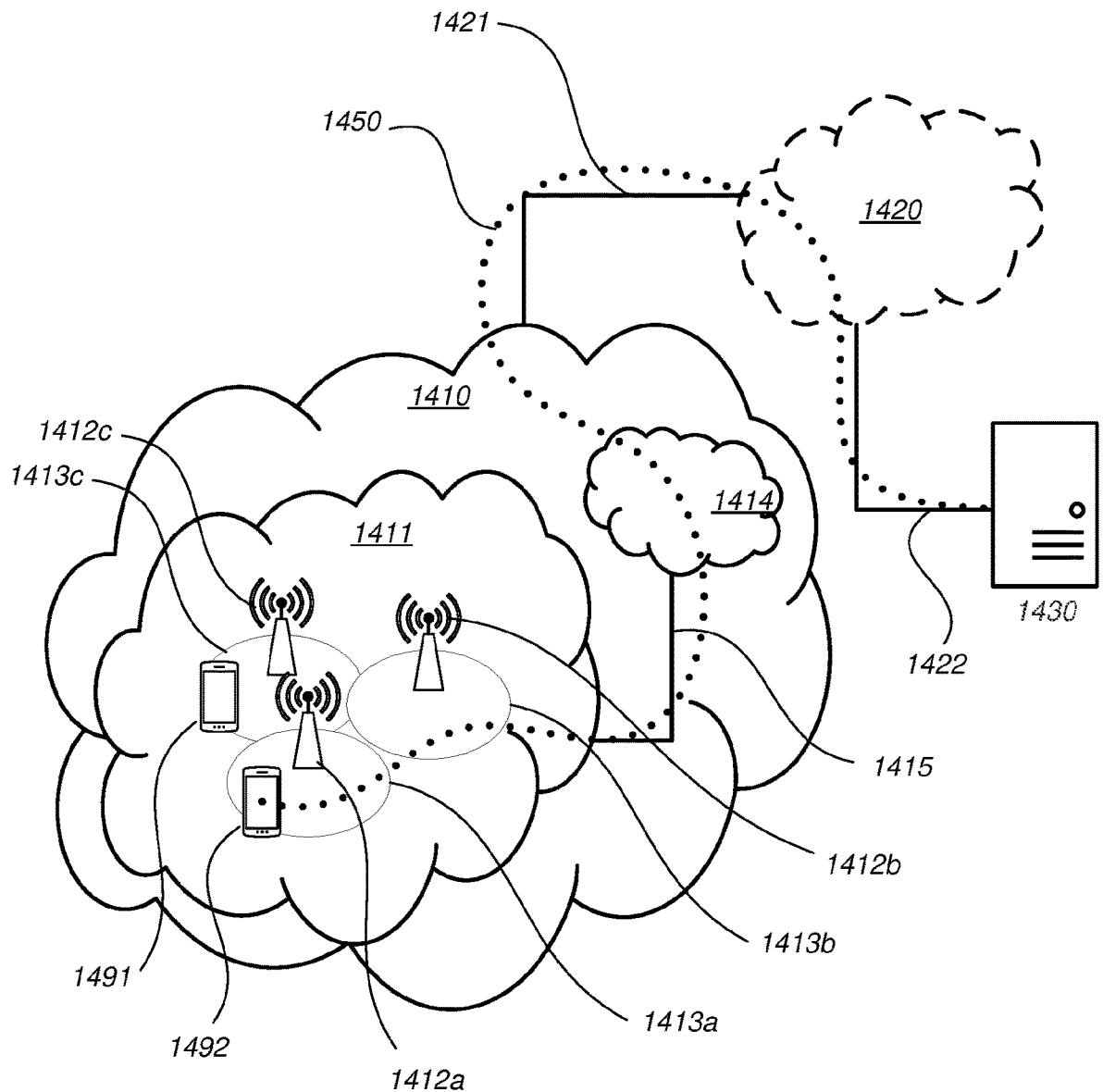
FIG. 14 schematically illustrates a telecommunication network connected via an intermediate network to a host computer, according to some embodiments.

FIG. 14, according to some embodiments, illustrates a communication system that includes a telecommunication network 1410, such as a 3GPP-type cellular network, which comprises an access network 1411, such as a radio access network, and a core network 1414. The access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to the core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

The telecommunication network 1410 is itself connected to a host computer 1430, which may be embodied in the hardware and/or software of a standalone server, a cloud-implemented server, a distributed server or as processing resources in a server farm. The host computer 1430 may be under the ownership or control of a service provider, or may be operated by the service provider or on behalf of the service provider. The connections 1421, 1422 between the telecommunication network 1410 and the host computer 1430 may extend directly from the core network 1414 to the host computer 1430 or may go via an optional intermediate network 1420. The intermediate network 1420 may be one of, or a combination of more than one of, a public, private or hosted network; the intermediate network 1420, if any, may be a backbone network or the Internet; in particular, the intermediate network 1420 may comprise two or more sub-networks (not shown).

The communication system of FIG. 14 as a whole enables connectivity between one of the connected UEs 1491, 1492 and the host computer 1430. The connectivity may be described as an over-the-top (OTT) connection 1450. The host computer 1430 and the connected UEs 1491, 1492 are configured to communicate data and/or signaling via the OTT connection 1450, using the access network 1411, the core network 1414, any intermediate network 1420 and possible further infrastructure (not shown) as intermediaries. The OTT connection 1450 may be transparent in the sense that the participating communication devices through which the OTT connection 1450 passes are unaware of routing of uplink and downlink communications. For example, a base station 1412 may not or need not be informed about the past routing of an incoming downlink communication with data originating from a host computer 1430 to be forwarded (e.g., handed over) to a connected UE 1491. Similarly, the base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In a communication system 1500, a host computer 1510 comprises hardware 1515 including a communication interface 1516 configured to set up and maintain a wired or wireless connection with an interface of a different communication device of the communication system 1500. The host computer 1510 further comprises processing circuitry 1518, which may have storage and/or processing capabilities. In particular, the processing circuitry 1518 may comprise one or more programmable processors, application-specific integrated circuits, field programmable gate arrays or combinations of these (not shown) adapted to execute instructions. The host computer 1510 further comprises software 1511, which is stored in or accessible by the host computer 1510 and executable by the processing circuitry 1518. The software 1511 includes a host application 1512. The host application 1512 may be operable to provide a service to a remote user, such as a UE 1530 connecting via an OTT connection 1550 terminating at the UE 1530 and the host computer 1510. In providing the service to the remote user, the host application 1512 may provide user data which is transmitted using the OTT connection 1550.

The communication system 1500 further includes a base station 1520 provided in a telecommunication system and comprising hardware 1525 enabling it to communicate with the host computer 1510 and with the UE 1530. The hardware 1525 may include a communication interface 1526 for setting up and maintaining a wired or wireless connection with an interface of a different communication device of the communication system 1500, as well as a radio interface 1527 for setting up and maintaining at least a wireless connection 1570 with a UE 1530 located in a coverage area (not shown in FIG. 15) served by the base station 1520. The communication interface 1526 may be configured to facilitate a connection 1560 to the host computer 1510. The connection 1560 may be direct or it may pass through a core network (not shown in FIG. 15) of the telecommunication system and/or through one or more intermediate networks outside the telecommunication system. In the embodiment shown, the hardware 1525 of the base station 1520 further includes processing circuitry 1528, which may comprise one or more programmable processors, application-specific integrated circuits, field programmable gate arrays or combinations of these (not shown) adapted to execute instructions. The base station 1520 further has software 1521 stored internally or accessible via an external connection.

The communication system 1500 further includes the UE 1530 already referred to. Its hardware 1535 may include a radio interface 1537 configured to set up and maintain a wireless connection 1570 with a base station serving a coverage area in which the UE 1530 is currently located. The hardware 1535 of the UE 1530 further includes processing circuitry 1538, which may comprise one or more programmable processors, application-specific integrated circuits, field programmable gate arrays or combinations of these (not shown) adapted to execute instructions. The UE 1530 further comprises software 1531, which is stored in or accessible by the UE 1530 and executable by the processing circuitry 1538. The software 1531 includes a client application 1532. The client application 1532 may be operable to provide a service to a human or non-human user via the UE 1530, with the support of the host computer 1510. In the host computer 1510, an executing host application 1512 may communicate with the executing client application 1532 via the OTT connection 1550 terminating at the UE 1530 and the host computer 1510. In providing the service to the user, the client application 1532 may receive request data from the host application 1512 and provide user data in response to the request data. The OTT connection 1550 may transfer both the request data and the user data. The client application 1532 may interact with the user to generate the user data that it provides.

Figure 15:
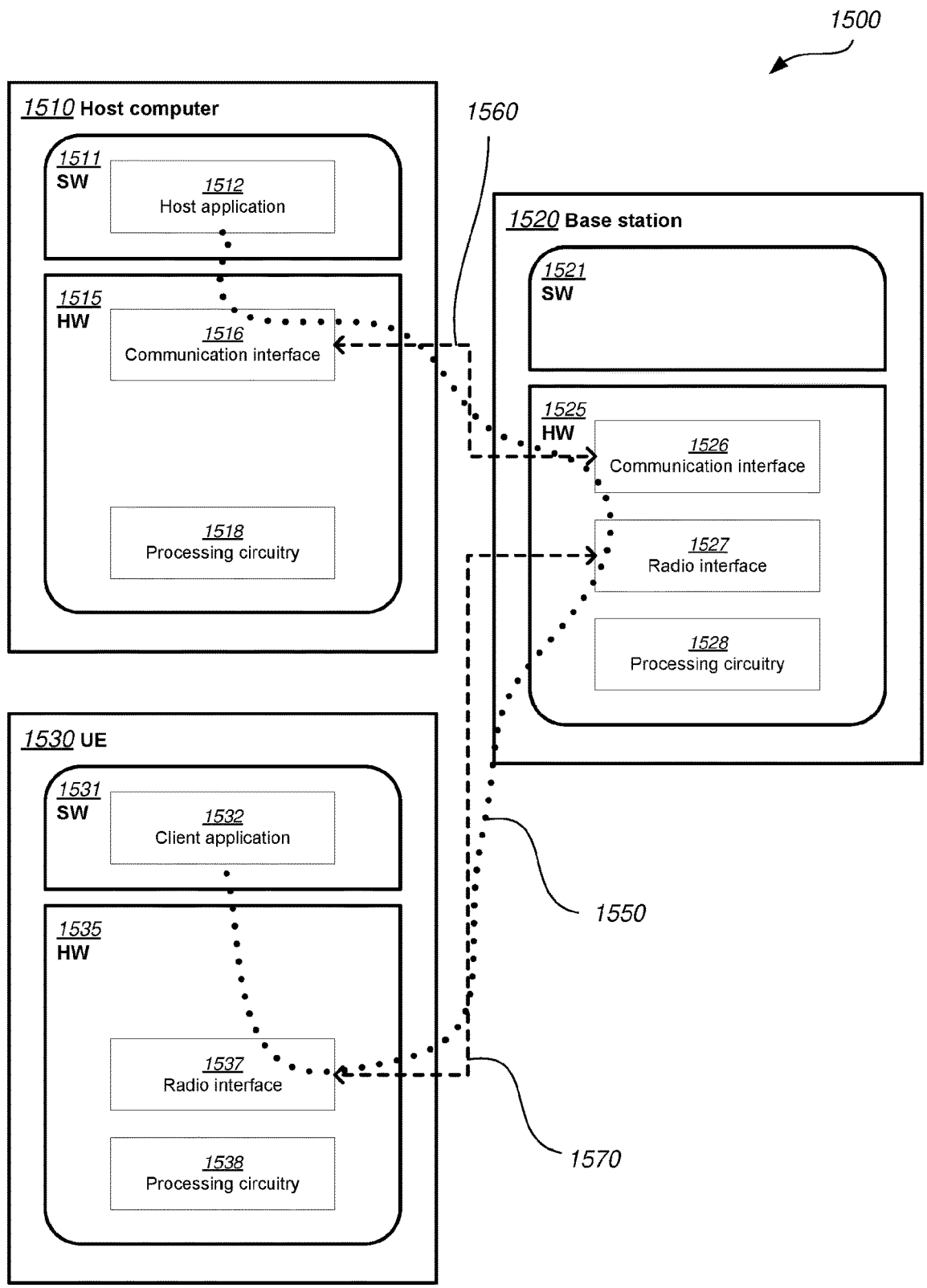
FIG. 15 is a generalized block diagram of a host computer communicating via a base station with a user equipment over a partially wireless connection, according to some embodiments.

It is noted that the host computer 1510, base station 1520 and UE 1530 illustrated in FIG. 15 may be identical to the host computer 1430, one of the base stations 1412a, 1412b, 1412c and one of the UEs 1491, 1492 of FIG. 14, respectively. This is to say, the inner workings of these entities may be as shown in FIG. 15 and independently, the surrounding network topology may be that of FIG. 14.

In FIG. 15, the OTT connection 1550 has been drawn abstractly to illustrate the communication between the host computer 1510 and the use equipment 1530 via the base station 1520, without explicit reference to any intermediary devices and the precise routing of messages via these devices. Network infrastructure may determine the routing, which it may be configured to hide from the UE 1530 or from the service provider operating the host computer 1510, or both. While the OTT connection 1550 is active, the network infrastructure may further take decisions by which it dynamically changes the routing (e.g., on the basis of load balancing consideration or reconfiguration of the network).

The wireless connection 1570 between the UE 1530 and the base station 1520 is in accordance with the teachings of the embodiments described throughout this disclosure, such as provided by nodes such as wireless device 50 and base station 30, along with the corresponding methods 1100 and 1300. Due to the requirement that a selected CQI index must correspond to a combination of modulation scheme and transport block size which could be signaled for transmission on the PDSCH in the CSI reference resource, a signaled MCS code rate of 120/1024 would never correspond to an effective code rate closer to 78/1024 (CQI1) than 120/1024 (CQI2) unless there is a large discrepancy in the PDSCH overhead assumed in TBS determination procedure compared to the PDSCH overhead assumption in the CSI reference resource. To mitigate this inefficiency, embodiments of the present invention utilize the un-used CQI codepoint to convey some useful information. Using an un-utilized codepoint to provide the gNB with additional information enables the gNB to perform better scheduling decisions and/or provide reconfiguration of DMRS densities. The teachings of these embodiments may improve the data rate, capacity, latency and/or power consumption for the network and UE 1530 using the OTT connection 1550 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1550 between the host computer 1510 and UE 1530, in response to variations in the measurement results. The measurement procedure and/or the network functionality for reconfiguring the OTT connection 1550 may be implemented in the software 1511 of the host computer 1510 or in the software 1531 of the UE 1530, or both. In embodiments, sensors (not shown) may be deployed in or in association with communication devices through which the OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of the OTT connection 1550 may include message format, retransmission settings, preferred routing etc.; the reconfiguring need not affect the base station 1520, and it may be unknown or imperceptible to the base station 1520. Such procedures and functionalities may be known and practiced in the art. In certain embodiments, measurements may involve proprietary UE signaling facilitating the host computer's 1510 measurements of throughput, propagation times, latency and the like. The measurements may be implemented in that the software 1511, 1531 causes messages to be transmitted, in particular empty or 'dummy' messages, using the OTT connection 1550 while it monitors propagation times, errors etc.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 1610 of the method, the host computer provides user data. In an optional substep 1611 of the first step 1610, the host computer provides the user data by executing a host application. In a second step 1620, the host computer initiates a transmission carrying the user data to the UE. In an optional third step 1630, the base station transmits to the UE the user data which was carried in the transmission that the host computer initiated, in accordance with the teachings of the embodiments described throughout this disclosure. In an optional fourth step 1640, the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 1710 of the method, the host computer provides user data. In an optional substep (not shown) the host computer provides the user data by executing a host application. In a second step 1720, the host computer initiates a transmission carrying the user data to the UE. The transmission may pass via the base station, in accordance with the teachings of the embodiments described throughout this disclosure. In an optional third step 1730, the UE receives the user data carried in the transmission.

Figure 18:
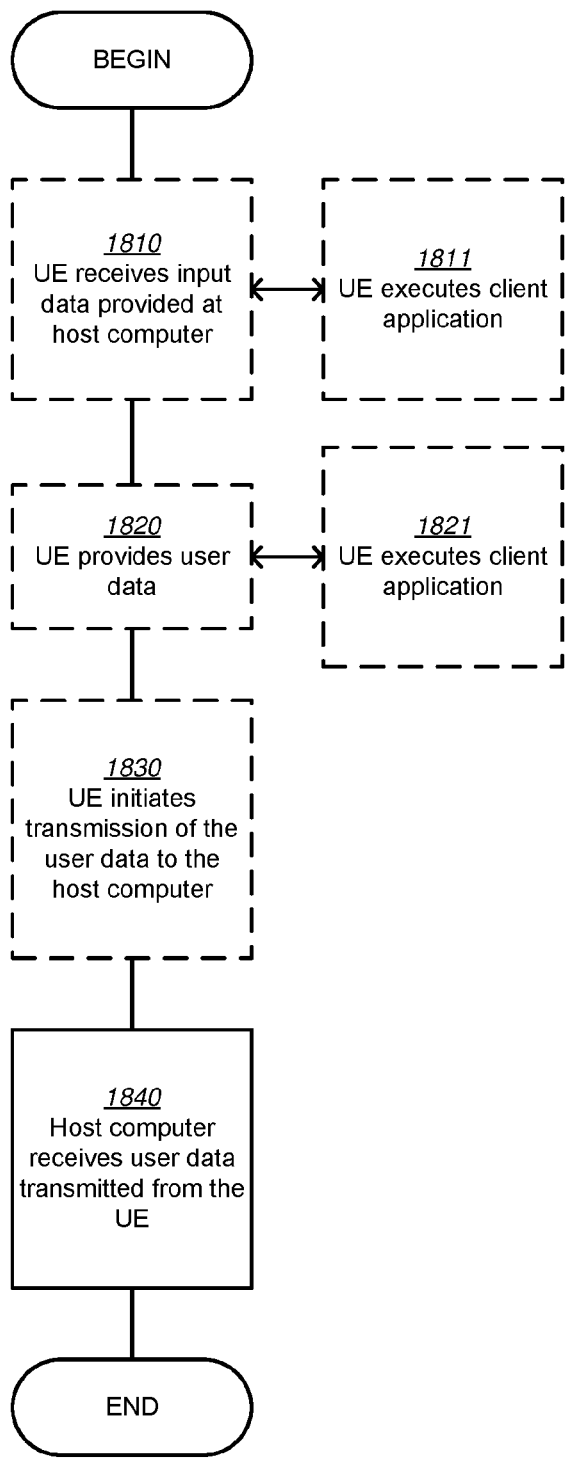

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 1810 of the method, the UE receives input data provided by the host computer. Additionally, or alternatively, in an optional second step 1820, the UE provides user data. In an optional substep 1821 of the second step 1820, the UE provides the user data by executing a client application. In a further optional substep 1811 of the first step 1810, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1830, transmission of the user data to the host computer. In a fourth step 1840 of the method, the host computer receives the user data transmitted from the UE, in accordance with the teachings of the embodiments described throughout this disclosure.

Figure 19:
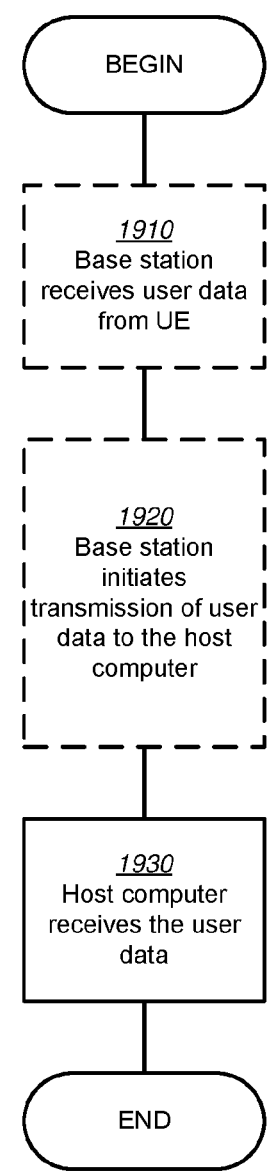

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 1910 of the method, in accordance with the teachings of the embodiments described throughout this disclosure, the base station receives user data from the UE. In an optional second step 1920, the base station initiates transmission of the received user data to the host computer. In a third step 1930, the host computer receives the user data carried in the transmission initiated by the base station.

Some other embodiments will now be described based on what is shown in OTT FIGS. 14-19. According to some embodiments, a communication system including a host computer comprises processing circuitry configured to provide user data and a communication interface configured to forward user data to a cellular network, where the UE is configured to report, to a base station, CQI using a predetermined set of CQI index values, each of the CQI index values being interpreted by the UE and the base station as corresponding to a combination of modulation and coding rate, and wherein the UE comprises a radio interface and processing circuitry. The UE's processing circuitry is configured to determine, based on a downlink signal configuration, that a first one of the CQI index values corresponds to no modulation and coding rate that can be used for transmissions to the UE from the base station. The UE's processing circuitry is also configured to transmit the first one of the CQI index values to the base station to signal information other than a combination of modulation and coding rate. The communication system may include the UE. The cellular network may further include a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system including a host computer, a base station and a UE, includes at the host computer, providing user data and initiating a transmission carrying the user data to the UE via a cellular network comprising the base station, where the UE is configured to report, to a base station, CQI using a predetermined set of CQI index values, each of the CQI index values being interpreted by the UE and the base station as corresponding to a combination of modulation and coding rate. The method at the UE comprises determining, based on a downlink signal configuration, that a first one of the CQI index values corresponds to no modulation and coding rate that can be used for transmissions to the UE from the base station. The method at the UE also comprises transmitting the first one of the CQI index values to the base station to signal information other than a combination of modulation and coding rate. The method at the UE may include receiving the user data from the base station.

According to some embodiments, a communication system including a host computer comprises a communication interface configured to receive user data originating from a transmission from a UE to a base station, the UE's processing circuitry configured report, to a base station, CQI using a predetermined set of CQI index values, each of the CQI index values being interpreted by the UE and the base station as corresponding to a combination of modulation and coding rate. The UE's processing circuitry is configured to determine, based on a downlink signal configuration, that a first one of the CQI index values corresponds to no modulation and coding rate that can be used for transmissions to the UE from the base station and transmit the first one of the CQI index values to the base station to signal information other than a combination of modulation and coding rate. The communication system may further include the UE and/or the base station, where the base station comprises a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE configured to report, to a base station, CQI using a predetermined set of CQI index values, each of the CQI index values being interpreted by the UE and the base station as corresponding to a combination of modulation and coding rate, includes determining, based on a downlink signal configuration, that a first one of the CQI index values corresponds to no modulation and coding rate that can be used for transmissions to the UE from the base station, and transmitting the first one of the CQI index values to the base station to signal information other than a combination of modulation and coding rate. The method may include providing user data and forwarding the user data to a host computer via the transmission to the base station.

According to some embodiments, a method implemented in a communication system including a host computer, a base station and a UE, includes at the host computer, receiving user data transmitted to the base station from the UE, where the UE is configured to report, to a base station, CQI using a predetermined set of CQI index values, each of the CQI index values being interpreted by the UE and the base station as corresponding to a combination of modulation and coding rate. The method at the UE comprises determining, based on a downlink signal configuration, that a first one of the CQI index values corresponds to no modulation and coding rate that can be used for transmissions to the UE from the base station and transmitting the first one of the CQI index values to the base station to signal information other than a combination of modulation and coding rate. The method at the UE may further include providing the user data to the base station. The method may further include at the UE, executing a client application, thereby providing the user data to be transmitted and at the host computer, executing a host application associated with the client application. The method may further include, at the UE, executing a client application and receiving input data to the client application, the input data being provided at the host computer by executing a host application associated with the client application, where the user data to be transmitted is provided by the client application in response to the input data.

According to some embodiments, a communication system including a host computer comprises a communication interface configured to receive user data originating from a transmission from a UE to a base station configured to receive, from the UE, CQI that uses a predetermined set of CQI index values, each of the CQI index values being interpreted by the UE and the base station as corresponding to a combination of modulation and coding rate. The base station comprises a radio interface and processing circuitry, the base station's processing circuitry configured to receive a first one of the CQI index values and determine, based on a downlink signal configuration, that the first one of the CQI index values corresponds to no modulation and coding rate that can be used for transmissions to the UE from the base station. The base station's processing circuitry is configured to, responsive to said determining, interpret the received first one of the CQI index values to signal information other than a combination of modulating and coding rate. The communication system may include the base station and/or the UE, where the UE is configured to communicate with the base station. The processing circuitry of the host computer may be configured to execute a host application, and the UE may be configured to execute a client application associated with the host application, thereby providing the user data to be received by the host computer.

According to some embodiments, a method implemented in a communication system including a host computer, a base station and a UE, comprises, at the host computer, receiving, from the base station, user data originating from a transmission which the base station has received from the UE, where the base station is configured to receive, from the UE, CQI that uses a predetermined set of CQI index values, each of the CQI index values being interpreted by the UE and the base station as corresponding to a combination of modulation and coding rate. The method at the base station comprises receiving a first one of the CQI index values and determining, based on a downlink signal configuration, that the first one of the CQI index values corresponds to no modulation and coding rate that can be used for transmissions to the wireless device from the base station. The method at the base station also includes, responsive to said determining, interpreting the received first one of the CQI index values to signal information other than a combination of modulating and coding rate. The method at the base station may include receiving the user data from the UE and/or initiating a transmission of the received user data to the host computer.

According to some embodiments, a communication system including a host computer comprises processing circuitry configured to provide user data and a communication interface configured to forward the user data to a cellular network for transmission to a UE. The cellular network comprises a base station configured to receive, from the UE CQI that uses a predetermined set of CQI index values, each of the CQI index values being interpreted by the UE and the base station as corresponding to a combination of modulation and coding rate. The base station is also configured to receive a first one of the CQI index values and determine, based on a downlink signal configuration, that the first one of the CQI index values corresponds to no modulation and coding rate that can be used for transmissions to the UE from the base station. The base station is also configured to, responsive to said determining, interpret the received first one of the CQI index values to signal information other than a combination of modulating and coding rate. The communication system may include the base station and may include the UE, where the UE is configured to communicate with the base station. The processing circuitry of the host computer may be configured to execute a host application, thereby providing the user data, and the UE may comprise processing circuitry configured to execute a client application associated with the host application.

According to some embodiments, a method implemented in a communication system including a host computer, a base station and a UE, comprises at the host computer, providing user data and initiating a transmission carrying the user data to the UE via a cellular network comprising the base station, wherein the base station is configured to receive, from the UE, CQI that uses a predetermined set of CQI index values, each of the CQI index values being interpreted by the UE and the base station as corresponding to a combination of modulation and coding rate. The method comprises, at the base station, receiving a first one of the CQI index values and determining, based on a downlink signal configuration, that the first one of the CQI index values corresponds to no modulation and coding rate that can be used for transmissions to the UE from the base station. The method at the base station also includes, responsive to said determining, interpreting the received first one of the CQI index values to signal information other than a combination of modulating and coding rate. The method may include, at the base station, transmitting the user data, and the user data may be provided at the host computer by executing a host application. The method may further comprise, at the UE, executing a client application associated with the host application.

As discussed in detail above, the techniques described herein, e.g., as illustrated in the process flow diagrams of FIGS. 11 and 13, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 20:
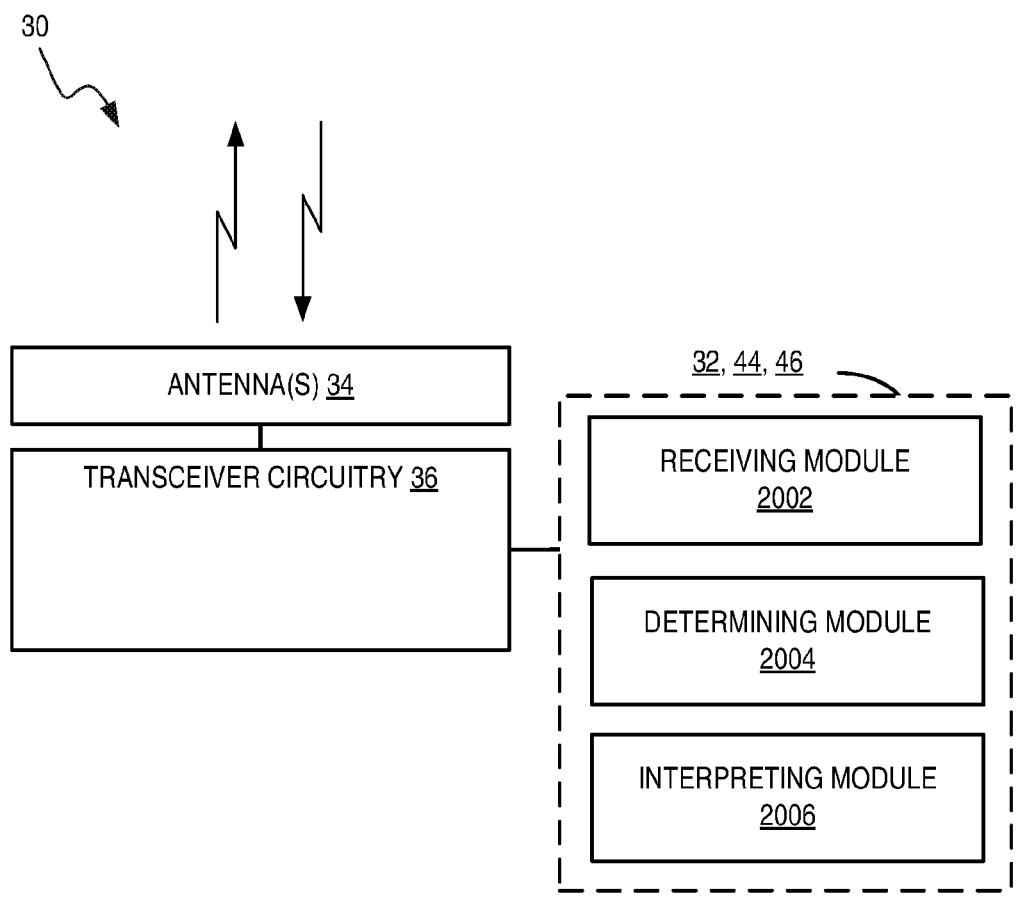
FIG. 20 is a block diagram illustrating a functional implementation of a base station, according to some embodiments.

FIG. 20 illustrates an example functional module or circuit architecture for a base station configured to receive, from a wireless device, CQI that uses a predetermined set of CQI index values, where each of the CQI index values is interpreted by the wireless device and the base station as corresponding to a combination of modulation and coding rate. The implementation includes a receiving module 2002 for receiving a first one of the CQI index values and a determining module 2004 for determining, based on a downlink signal configuration, that the first one of the CQI index values corresponds to no modulation and coding rate that can be used for transmissions to the wireless device from the base station. The implementation also includes an interpreting module 2006 for, responsive to said determining, interpreting the received first one of the CQI index values to signal information other than a combination of modulating and coding rate.

Figure 21:
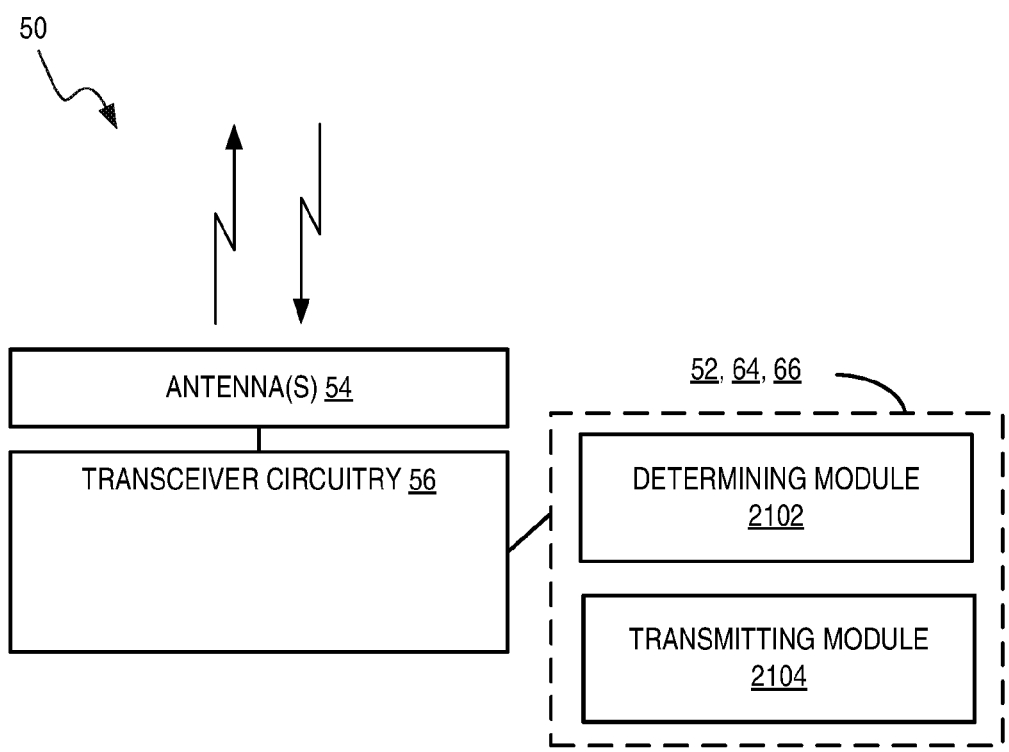
FIG. 21 is a block diagram illustrating a functional implementation of a wireless device, according to some embodiments.

FIG. 21 illustrates an example functional module or circuit architecture for wireless device 50 configured to report, to a base station, CQI using a predetermined set of CQI index values, each of the CQI index values being interpreted by the wireless device and the base station as corresponding to a combination of modulation and coding rate. The implementation includes a determining module 2102 for determining, based on a downlink signal configuration, that a first one of the CQI index values corresponds to no modulation and coding rate that can be used for transmissions to the wireless device from the base station. The implementation also includes a transmitting module 2104 for transmitting the first one of the CQI index values to the base station to signal information other than a combination of modulation and coding rate.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method in a wireless device configured to report, to a base station, channel quality information, CQI, using a predetermined set of CQI index values, wherein each CQI index value is interpreted by the wireless device and the base station as corresponding to a combination of modulation and coding rate, the method comprising:
   determining, based on a downlink signal configuration, that a first one of the CQI index values corresponds to no modulation and coding rate that can be used for transmissions to the wireless device from the base station; and
   transmitting the first one of the CQI index values to the base station to signal information other than a combination of modulation and coding rate,
   wherein determining that the first one of the CQI index values corresponds to no modulation and coding rate that can be used comprises determining that the number of OFDM symbols per subframe occupied by DMRS symbols is not 4 and the configured number of overhead resource elements per resource block is not 18.

2. The method of claim 1, wherein an additional CQI index value is interpreted by the base station as an out of range indication, and wherein the information signaled with the first one of the CQI index values is an alternative out of range indication.

3. The method of claim 1, wherein the information indicates that a demodulation reference signal, DMRS, density does not provide sufficient channel estimation accuracy for the wireless device to correctly demodulate symbols on a physical downlink shared channel, PDSCH.

4. A method in a base station configured to receive, from a wireless device, channel quality information, CQI, that uses a predetermined set of CQI index values, wherein a CQI index value is interpreted by the wireless device and the base station as corresponding to a combination of modulation and coding rate, the method comprising:
   receiving a first one of the CQI index values;
   determining, based on a downlink signal configuration, that the first one of the CQI index values corresponds to no modulation and coding rate that can be used for transmissions to the wireless device from the base station; and responsive to the determining, interpreting the received first one of the CQI index values to signal information other than a combination of modulating and coding rate, wherein determining that the first one of the CQI index values corresponds to no modulation and coding rate that can be used comprises determining that the number of OFDM symbols per subframe occupied by DMRS symbols is not 4 and the configured number of overhead resource elements per resource block is not 18.

5. The method of claim 4, wherein an additional CQI index value is interpreted by the base station as an out of range indication, and wherein the information signaled with the first one of the CQI index values is an alternative out of range indication.

6. The method of claim 4, wherein the information indicates that a demodulation reference signal, DMRS, density does not provide sufficient channel estimation accuracy for the wireless device to correctly demodulate symbols on a physical downlink shared channel, PDSCH.

7. A wireless device adapted to perform the method of claim 1.

8. A wireless device comprising transceiver circuitry and processing circuitry operatively associated with the transceiver circuitry and configured to perform the method of claim 1.

9. A base station adapted to perform the method of claim 4.

10. A base station comprising transceiver circuitry and processing circuitry operatively associated with the transceiver circuitry and configured to perform the method of claim 4.

11. A base station configured to receive, from a wireless device, channel quality information, CQI, that uses a predetermined set of CQI index values, wherein a CQI index value is interpreted by the wireless device and the base station as corresponding to a combination of modulation and coding rate, the base station comprising a processing circuitry configured to:

a receiving module for receiving a first one of the CQI index values;

a determining module for determining, based on a downlink signal configuration, that the first one of the CQI index values corresponds to no modulation and coding rate that can be used for transmissions to the wireless device from the base station; and an interpreting module for, responsive to the determining, interpreting the received first one of the CQI index values to signal information other than a combination of modulating and coding rate, wherein determining that the first one of the CQI index values corresponds to no modulation and coding rate that can be used comprises determining that the number of OFDM symbols per subframe occupied by DMRS symbols is not 4 and the configured number of overhead resource elements per resource block is not 18.

12. A wireless device configured to report, to a base station, channel quality information, CQI, using a predetermined set of CQI index values, wherein a CQI index value is interpreted by the wireless device and the base station as corresponding to a combination of modulation and coding rate, the wireless device comprising a processing circuitry configured to:

a determining module for determining, based on a downlink signal configuration, that a first one of the CQI index values corresponds to no modulation and coding rate that can be used for transmissions to the wireless device from the base station; and a transmitting module for transmitting the first one of the CQI index values to the base station to signal information other than a combination of modulation and coding rate, wherein determining that the first one of the CQI index values corresponds to no modulation and coding rate that can be used comprises determining that the number of OFDM symbols per subframe occupied by DMRS symbols is not 4 and the configured number of overhead resource elements per resource block is not 18.

* * * * *